United States Patent
Yamamoto et al.

[11] Patent Number: 5,911,815
[45] Date of Patent: *Jun. 15, 1999

[54] INK SET AND INK-JET RECORDING METHOD USING THE SAME

[75] Inventors: Mayumi Yamamoto, Tokyo; Yoshihisa Takizawa, Machida; Mikio Sanada, Yokohama; Eriko Saito, Fujisawa, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/755,367

[22] Filed: Nov. 25, 1996

[30] Foreign Application Priority Data

Nov. 30, 1995 [JP] Japan ................................ 7-334363
Nov. 30, 1995 [JP] Japan ................................ 7-334364

[51] Int. Cl.[6] ......................... C09D 11/00; B41M 5/00; B41J 2/005
[52] U.S. Cl. ............................... 106/31.27; 106/31.59; 106/31.37; 106/31.36; 106/31.43; 347/100
[58] Field of Search ...................... 106/31.27, 31.59, 106/31.43, 31.36, 31.37; 347/100

[56] References Cited

U.S. PATENT DOCUMENTS

| | | | |
|---|---|---|---|
| 4,077,930 | 3/1978 | Lim et al. ...................... | 260/29.6 TA |
| 4,484,952 | 11/1984 | Bes et al. ........................ | 106/308 Q |
| 5,021,802 | 6/1991 | Allred ............................... | 346/1.1 |
| 5,085,698 | 2/1992 | Ma et al. ........................ | 106/20 |
| 5,106,416 | 4/1992 | Moffatt et al. ................. | 106/31.49 |
| 5,116,409 | 5/1992 | Moffatt .......................... | 106/31.43 |
| 5,151,218 | 9/1992 | Haubennestel et al. ......... | 252/351 |
| 5,198,023 | 3/1993 | Stoffel ............................. | 106/22 R |
| 5,310,778 | 5/1994 | Shor et al. ....................... | 524/556 |
| 5,451,251 | 9/1995 | Mafune et al. .................. | 106/22 H |
| 5,482,545 | 1/1996 | Aoki et al. ....................... | 106/22 K |
| 5,541,031 | 7/1996 | Yamashita et al. .............. | 430/109 |
| 5,555,008 | 9/1996 | Stoffel et al. .................... | 347/100 |
| 5,571,313 | 11/1996 | Mafune et al. .................. | 106/22 |
| 5,593,757 | 1/1997 | Kashiwazaki et al. .......... | 428/195 |

FOREIGN PATENT DOCUMENTS

| | | |
|---|---|---|
| 0576151 A1 | 12/1993 | European Pat. Off. . |
| 0588241 A2 | 3/1994 | European Pat. Off. . |
| 588316 | 3/1994 | European Pat. Off. . |
| 0603898 A1 | 6/1994 | European Pat. Off. . |
| 0633142 A1 | 4/1995 | European Pat. Off. . |
| 0675178 A2 | 10/1995 | European Pat. Off. . |

*Primary Examiner*—Melissa Bonner
*Attorney, Agent, or Firm*—Fitzpatrick, Cella, Harper & Scinto

[57] ABSTRACT

Disclosed herein is an ink set comprising in combination at least two inks of different colors, wherein at least one ink comprises a cationic dye and an amphoteric compound, and another ink of a color different from said one ink comprises an anionic dye and a water-soluble anionic polymer or nonionic polymer in addition to the dye.

42 Claims, 2 Drawing Sheets

INK SET AND INK-JET RECORDING METHOD USING THE SAME

BACKGROUND OF THE INVENTION

1. Field of the Invention

The present invention relates to an ink set suitable for use in recording color images on a recording medium by using plural color inks of at least two different colors in combination and an ink-jet recording method using such the ink set, and more particularly to an ink set, which permits the provision of bright images with sufficient image density and high quality in image recording according to an ink-jet system, and an ink-jet recording method using such the ink set.

2. Related Background Art

An ink-jet recording method is a recording method in which recording is conducted by generating and ejecting minute droplets of an ink by one of various ink ejection systems, for example, an electrostatic attraction system by application of high voltage, a system using a piezoelectric element to give an ink (colored ink) mechanical vibration or displacement, or a system in which an ink is heated to form bubbles in the ink, thereby using the pressure thus produced, and applying the ink to a recording medium such as paper to form ink dots, and is a recording method which scarcely produces noise and can conduct high-speed printing and color printing.

The images recorded by using such an ink-jet recording method as described above are applied to various purposes, for example, for the observation of surface images in the case where the recording has been conducted with plain paper or the so-called paper for ink-jet recording, or for the observation of projected images formed by projecting the recorded images on a screen or the like by an optical instrument such as a slide projector or an over-head projector (OHP), and besides, as a color separation plate upon the preparation of a positive plate for multi-color printing, a color mosaic filter (CMF) used in color display devices using liquid crystals or the like in the case where the recording has been conducted with a transparent recording medium.

On the other hand, when a color image is formed by the ink-jet recording method, a recording method by a subtractive color mixture process may be mentioned as a representative method. When the color image is formed by the subtractive color process, three primary colors of cyan (C), magenta (M) and yellow (Y) are generally used.

Colors expressible by mixing at least two of these three primary colors in the same pixel (i.e., by applying ink droplets of different colors to the same pixel so as to overlap each other, thereby conducting recording) are basically the following four colors. Therefore, colors expressible by the three colors of C, M and Y are basically 7 colors of C, M, Y, red (R), green (G), blue (B) and black (Bk). A color image made up of these seven colors is designated false color image.

(1) C+M→B (2) C+Y→G (3) M+Y→R (4) C+M+Y→Bk.

Namely, when recording is conducted by such a recording method, it is basically only necessary to provide 3 inks of different colors for three primary colors of C, M and Y.

When Bk is expressed by the three primary colors of C, M and Y, however, it is printed by ejecting ink droplets of the three primary colors, C, M and Y so as to overlap one another, and the inks of the respective colors are used in substantially the same volumes for the ink droplets. Therefore, the Bk dot formed by applying the three ink droplets to a recording medium so as to overlap one another is more enlarged than it needs compared with dots of portions recorded in colors other than Bk, and dot gain occurs at such a portion, so that there are caused problems that unnatural image are formed and that a failure in ink absorption in the recording medium occurs because of increased ink quantity at the portion. Further, since frequency of recording by Bk is generally high upon recording, these problems are important.

For this reason, besides the inks of the three primary colors, C, M and Y, a Bk ink is added for the expression of Bk, whereby the four inks of different colors are generally used. However, when recording is conducted with the four inks of C, M, Y and Bk colors, droplets of two inks of different colors are ejected so as to overlap each other at portions printed in B, G and R colors. At this time, it takes some time to absorb ink droplets increased in quantity, in particular, when the recording medium is wood free paper containing a size. Therefore, the ink droplets enter interfiber spaces of the paper in all directions of the recording medium, including the sectional direction thereof, during the absorption. As a result, uneven dots are formed, so that irregular dot gain, or the so-called feathering occurs, which causes a problem that edges of a recorded image are blunted, resulting in a blurred image.

Besides, when two ink droplets of different colors are ejected adjoiningly to each other, the ink droplets partially mix with each other at the boundary between these colors before they are fixed. As a result, bleeding occurs between the different colors, which also causes a problem that a blurred image is formed.

As a method for solving the problems as described above, it is considered to make the rate of penetration of ink droplets into a recording medium high. By doing so, the surface tensions of individual inks are reduced, so that it can be realized to improve the wettability of the inks to the recording medium. However, recording with the inks reduced in surface tension may cause a problem that dots are more enlarged than they need on a recording medium, resulting in dot gain, or that since the rate of penetration is made high, coloring materials contained in the inks also markedly penetrate into the interior of the recording medium, resulting in reduction of color density.

In particular, although a Bk ink is often used also in recording of picture images, its frequency of use becomes higher when recording characters. Therefore, when the color density of the Bk ink at the time it is used in the recording of characters is made higher than those of other colors, and sharp edges free of any unnatural dot gain are formed, an image, which leaves a more favorable impression to look at it, can be provided. Thus, for example, when the surface tension of only a Bk ink among many color inks is raised to some extent, and recording is conducted with such an ink to lower its rate of penetration into a recording medium, a bright black image with high color density can be surely obtained. However, such an attempt results in a failure to solve the problem of feathering caused by applying the Bk ink and another ink so as to overlap each other, and the problem of bleeding occurred at boundaries between the Bk ink and the other inks.

SUMMARY OF THE INVENTION

It is therefore an object of the present invention to provide an ink set, which can solve the above problems involved in the prior art and permits the formation of color images having high color density and sharp edges in an ink-jet recording method making use of at least two inks of different colors to record color images even when recording paper having a high sizing degree, which is particularly high in flexibility, is used, and an ink-jet recording method using such the ink set.

Another object of the present invention is to provide an ink set, which permits the formation of bright color images without causing irregular dot gain even when at least two inks of different colors are ejected so as to overlap each other at the same time and without causing bleeding even when two inks of different colors are ejected so as to adjoin each other, and an ink-jet recording method using such the ink set.

The above objects can be achieved by the present invention described below.

According to the present invention, there is thus provided an ink set comprising in combination at least two inks of different colors, wherein at least one ink comprises a cationic dye and an amphoteric compound, and another ink of a color different from said one ink comprises an anionic dye and a water-soluble anionic polymer or nonionic polymer in addition to the dye.

According to the present invention, there is also provided an ink set comprising in combination at least two inks of different colors, wherein at least one ink comprises a cationic dye and an amphoteric compound, and another ink of a color different from said one ink comprises an anionic dye and an anionic surfactant in addition to the dye.

According to the present invention, there is further provided an ink set comprising in combination at least two inks of different colors, wherein at least one ink comprises an anionic dye and an amphoteric compound, and another ink of a color different from said one ink comprises a cationic dye and a water-soluble cationic polymer or nonionic polymer in addition to the dye.

According to the present invention, there is still further provided an ink set comprising in combination at least two inks of different colors, wherein at least one ink comprises an anionic dye and an amphoteric compound, and another ink of a color different from said one ink comprises a cationic dye and a cationic surfactant in addition to the dye.

According to the present invention, there is yet still further provided an ink-jet recording method comprising using at least two inks of different colors to record color images in accordance with an ink-jet system, wherein any one of the ink sets described above is used as said inks.

DESCRIPTION OF THE PREFERRED EMBODIMENTS

Figure 1:
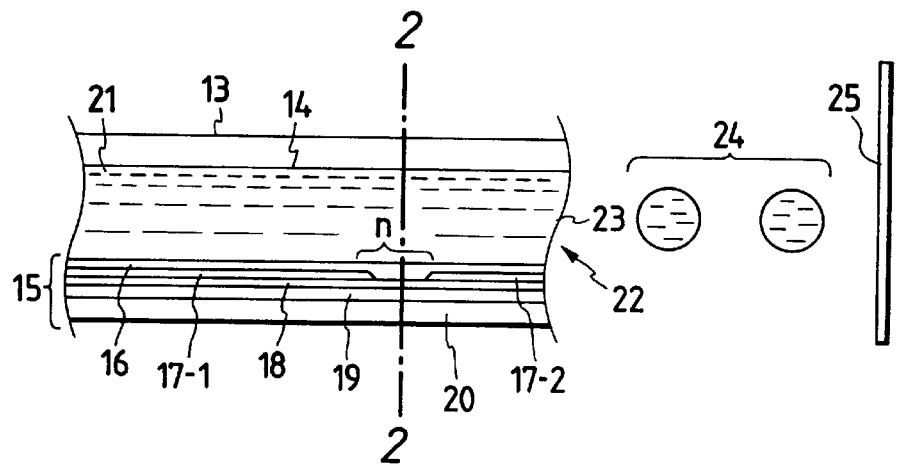
FIG. 1 is a longitudinal cross-sectional view of a head of an ink-jet recording apparatus.

The present invention will hereinafter be described in more detail by reference to preferred embodiments.

The effect of an ink set according to an aspect of the present invention will be first described. The description is given taking an ink set according to a preferred embodiment of the present invention as an example. An anionic dye and a water-soluble, non-cationic polymeric substance including an anionic polymer or a nonionic polymer are used as components for at least one color ink making up the ink set, and a cationic dye and an amphoteric compound are used in combination as components for another ink of a color different from said one ink, whereby undesirable color mixing of the inks can be prevented even when at least two inks of different colors are ejected so as to overlap each other at about the same time, or one ink is ejected on a recording medium and another ink of a color different from said one ink is then ejected so as to adjoin the former ink before the former ink become a dried state. As a result, it is possible to provide a color image reduced in the occurrence of feathering caused by irregular dot gain and of bleeding between adjoining different colors. More specifically, when two inks of different colors, which have the above-described components, respectively, are ejected so as to adjoin each other, the anionic dye and the cationic dye, which are coloring matter making up the respective inks, react with each other at the time of their contact to form an insoluble salt, whereby rapid color mixing between the liquids can be prevented. However, this is insufficiently effective to prevent the color mixing because the diffusion rate between the liquids of the two color inks is higher than the rate of the reaction and insolubilization.

In order to make this effect more sufficient, it is therefore necessary to more reduce the diffusion rate between the liquids. For that purpose, an anionic group possessed by the amphoteric compound contained in one ink first associates with any one of cationic groups possessed by the cationic dye contained in said one ink to increase an apparent molecular weight of the dye in the liquid medium of the ink. Then, the dye molecule increased in molecular weight in said one ink is entangled in the polymeric substance contained in the other ink of a color different from said one ink, whereby both inks are prevented from diffusion between them. Thus, the increase of the effect can be realized. At this time, when the polymeric substance is not-nonionic, such a substance can further associate with the ionic dye contained in the other ink or the associated matter of the dye with the amphoteric compound. Therefore, bleeding between the two color inks at the time of their fixing can be more effectively prevented.

In contrast with the above, even when a cationic dye and a water-soluble, non-anionic polymeric substance including a cationic polymer or a nonionic polymer are used as components for at least one color ink, and an anionic dye and an amphoteric compound are used as components for another ink of a color different from said one ink, exactly the same effect is brought about. In any case, the polymeric substance and the amphoteric compound may coexist with each other in one and the same color ink.

In the present invention, the amphoteric compound is caused to associate with the dye molecule to increase the molecular weight of the dye, and the polymeric substance is contained in the ink. Therefore, the thickening speed of the ink by drying upon its fixing is increased, and at the same time, the penetrability of the ink into surface of the recording medium is inhibited, so that the enlargement of a dot diameter and uneven dot gain are prevented. For this reason, the edges of the resulting recorded image are made sharp, and moreover high color density can be achieved.

The effect of an ink set according to another aspect of the present invention will now be described. The description is given taking an ink set according to a preferred embodiment of the present invention as an example. An anionic dye and an anionic surfactant are used as components for at least one color ink making up the ink set, and a cationic dye and an amphoteric compound are used in combination as components for another ink of a color different from said one ink, whereby undesirable color mixing of the inks can be prevented even when at least two inks of different colors are ejected so as to overlap each other at about the same time, or one ink is ejected on a recording medium and another ink of a color different from said one ink is then ejected so as to adjoin the former ink before the former ink become a dried state.

As a result, it is possible to provide a color image reduced in the occurrence of feathering caused by irregular dot gain and of bleeding between adjoining different colors. More specifically, when two inks of different colors, which have the above-described components, respectively, are ejected so as to adjoin each other, the anionic dye and the cationic dye, which are coloring matter making up the respective inks, react with each other at the time of their contact to form an insoluble salt, whereby rapid color mixing between the liquids can be prevented. However, this is insufficiently effective to prevent the color mixing because the diffusion rate between the liquids of the two different color inks is higher than the rate of the reaction and insolubilization, and the insoluble matter formed by the reaction diffuses between the two liquids of different colors if the molecular weight of the insoluble matter itself is insufficient.

In order to make this effect more sufficient, it is therefore necessary to more enhance the rate of the insolubilization reaction of the anionic substance with the cationic substance between the two inks of different colors. This can be realized by increasing the number of reactive groups between the two inks of different colors. Further, it is necessary to prevent the diffusion of the insoluble matter formed by the reaction of the anionic substance with the cationic substance. This can be realized by increasing the molecular weight of the insoluble matter formed.

In the case where the first ink contains the anionic dye, increase of the number of anionic groups, which are reactive groups, in the first ink and increase of the molecular weight of a salt formed from the anionic substance and the cationic substance contained in the second ink can be realized by adding an anionic surfactant with a hydrophobic group having a large number of carbon atoms concurrently with the anionic dye. Further, when an amphoteric compound is added together with the cationic dye to the second ink, a reaction product of the cationic dye with the amphoteric compound reacts with the anionic substance contained in the first ink to form a salt having a higher molecular weight, so that bleeding between the two inks of different colors at the time of their fixing and dot gain upon color mixing can be more effectively prevented.

In contrast with the above, in the case where the first ink contains the cationic dye, increase of the number of cationic groups, which are reactive groups, in the first ink and increase of the molecular weight of a salt formed from the cationic substance and the anionic substance contained in the second ink can be realized by adding a cationic surfactant with a hydrophobic group having a large number of carbon atoms concurrently with the cationic dye. Further, when an amphoteric compound is added together with the anionic dye to the second ink, a reaction product of the anionic dye with the amphoteric compound reacts with the cationic substance contained in the first ink to form a salt having a higher molecular weight, so that bleeding between the two inks of different colors at the time of their fixing and dot gain upon color mixing can be more effectively prevented.

The ink sets according to the present invention, which are composed as described above, are preferably used in ink-jet recording systems. In order to more effectively prevent the diffusion of two inks of different color between the liquids and more effectively inhibit the color mixing of the inks at boundaries between the liquids, it is more desirable to conduct recording in such a manner that right after a color image is printed on a recording medium, the print is dried. For that purpose, recording is preferably conducted by means of an ink-jet recording apparatus equipped with a mechanism for forcedly heating and drying the print right after the printing so as to enhance the quick-drying ability of the inks. As a method for forcedly heating and drying the inks used in this time, any method may be used. For example, a method using a heated roll, infrared heater or the like is preferably employed.

The components making up the ink set according to the first aspect of the present invention will now be described.

In the ink set of the present invention, a polymeric substance is contained in at least one color ink, and a water-soluble dye and an amphoteric compound are contained in another ink of a color different from said one ink. Examples of an ink set according to a preferred embodiment of the present invention include an ink set comprising in combination a first ink composed of an anionic dye of a certain color and a water-soluble anionic polymer or nonionic polymer, and a second ink composed of a cationic dye of a color different from the first ink and an amphoteric compound, and an ink set comprising in combination, in contrast with the above ink set, a first ink composed of a cationic dye of a certain color and a water-soluble cationic polymer or nonionic polymer, and a second ink composed of an anionic dye of a color different from the first ink and an amphoteric compound.

The ink set of the present invention, which is composed as described above by way of example, will be first be described. The first ink making up the ink set according to the present invention is a water-based ink obtained by dissolving a water-soluble dye and a water-soluble polymeric substance in a proper aqueous liquid medium.

As the water-soluble dye in such a water-based ink, anionic dyes or cationic dyes as described below are used. The concentration of the dye in the ink is suitably determined as desired. It is however desirable to adjust the concentration within a range of generally from 0.1 to 15% by weight, preferably from 0.5 to 10% by weight, more preferably from 1 to 5% by weight.

As the anionic dye, there may be used most anionic dyes including conventional dyes and newly synthesized dyes, for example, direct dyes, acid dyes, reactive dyes, etc., so far as they have proper color tone and density These dyes may be used in any combination thereof. As Specific examples of the anionic dyes, may be mentioned the following dyes:

C.I. Direct Black 17, 19, 22, 31, 32, 51, 62, 71, 74, 112, 113, 154 and 168;

C.I. Direct Yellow 8, 11, 12, 27, 28, 33, 39, 44, 50, 58, 85, 86, 87, 88, 89, 98, 100 and 110;

C.I. Direct Red 2, 4, 9, 11, 20, 23, 24, 31, 39, 46, 62, 75, 79, 80, 83, 89, 95, 197, 201, 218, 220, 224, 225, 226, 227, 228 and 230;

C.I. Direct Blue 1, 15, 22, 25, 41, 76, 77, 80, 86, 90, 98, 106, 108, 120, 158, 163, 168, 199 and 226;

C.I. Acid Black 2, 48, 51, 52, 110, 115, 156;

C.I. Acid Yellow 1, 3, 7, 11, 17, 23, 25, 29, 36, 38, 40, 42, 44, 76, 98 and 99;

C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;

C.I. Acid Blue 1, 7, 9, 15, 22, 23, 25, 29, 40, 43, 59, 62, 74, 78, 80, 90, 100, 102, 104, 117, 127, 138, 158 and 161;

C.I. Reactive Black 1, 8, 12 and 13;

C.I. Reactive Yellow 2, 3, 17, 25, 37 and 42;

C.I. Reactive Red 7, 12, 13, 15, 17, 20, 23, 24, 31, 42, 45, 46 and 59;

C.I. Reactive Blue 4, 5, 7, 13, 14, 15, 18, 19, 21, 26, 27, 29, 32, 38, 40, 44 and 100;

C.I. Food Black 1 and 2;

C.I. Food Yellow 3; and

C.I. Food Red 87, 92 and 94.

Besides, as examples of the cationic dyes, may be mentioned the following dyes:

C.I. Basic Black 2 and 8;

Aizen Cathilon Black SBH, BXH, SH, ACH, MH, TH (trade names, products of Hodogaya Chemical Co., Ltd.);

Sumiacryl Black B, R, AP, BP, CP and FFP (trade names, products of Sumitomo Chemical Co., Ltd.);

Diacryl Supra Black GSL, RSL and ESL (trade names, products of Mitsubishi Kagaku Co., Ltd.);

C.I. Basic Yellow 1, 11, 13, 19, 25, 33 and 36;

C.I. Basic Red 1, 2, 9, 12, 13, 38, 39 and 92; and

C.I. Basic Blue 1, 3, 5, 9, 19, 24, 25, 26, 28, 45, 54 and 65.

As the water-soluble polymeric substance used together with the water-soluble dyes as described above in the first ink making up the ink set of the present invention, a water-soluble anionic polymer or nonionic polymer is used in the case where the dye is an anionic dye, while a water-soluble cationic polymer or nonionic polymer is used in the case where the dye is a cationic dye. As such water-soluble polymeric substances, there may be suitably used most water-soluble polymeric substances including conventional substances and newly synthesized substances so far as they can impart proper physical properties necessary for the ink and the performance capable of achieving the objects of the present invention to the ink.

Examples of the anionic polymers include polyacrylic acid and alkali salts thereof, polymethacrylic acid and alkali salts thereof, styrene-acrylic acid copolymers and alkali salts thereof, styrene-acrylic acid-alkyl acrylate terpolymers and alkali salts thereof, styrene-maleic acid copolymers and alkali salts thereof, styrene-maleic acid-alkyl acrylate terpolymers and alkali salts thereof, styrene-methacrylic acid copolymers and alkali salts thereof, styrene-methacrylic acid-alkyl acrylate terpolymers and alkali salts thereof, styrene-maleic half ester copolymers and alkali salts thereof, vinylnaphthalene-maleic acid copolymers and alkali salts thereof, alginic acid and alkali salts thereof, polysaccharides such as carboxymethyl cellulose and alkali salts thereof, and polyvinyl sulfate and alkali salts thereof. Incidentally, examples of the alkali salts include salts with alkali metals such as sodium, lithium and potassium, and besides ammonium salts, alkylamine salts and alkanolamine salts. These anionic polymers may be used either singly or in any suitable combination thereof.

Examples of the nonionic polymers include polyvinyl alcohol, polyvinyl pyrrolidone, polyacrylamide, polyvinyl ether derivatives such as polyvinyl methyl ether, polyvinyl ethyl ether, polyvinyl isobutyl ether, polysaccharides such as cellulose, methyl cellulose and ethyloxyethyl cellulose, polyhydric alcohol esters of alginic acid, water-soluble urea resins, dextrin derivatives, casein, polyvinyl ether compounds, and polyalkylene oxides including polyethylene oxide, polypropylene oxide and copolymers of both oxides. These nonionic polymers may be used either singly or in any suitable combination thereof.

Examples of the cationic polymers include polyalkyleneimines including polyethylene-imine and polyisopropylene-imine, polyamines including polyalkylene polyamines and polyamide polyamine epichlorohydrin, water-soluble aniline resins and salts thereof, polythiourea and salts thereof, water-soluble cationic amino resins, polyvinyl pyridine and salts thereof, and cationically modified polyacrylamide. These cationic polymers may be used either singly or in any suitable combination thereof.

The molecular weight of such a water-soluble polymeric substance in the ink may desirably be within a range of from 3,000 to 100,000 in terms of a weight average molecular weight. It is preferable to use that having a molecular weight ranging from 3,000 to 50,000, more preferably from 3,000 to 20,000. The use of any polymer having a molecular weight lower than 3,000 is not desirable because the effect of the addition of the water-soluble polymer is not brought about. On the other hand, the use of any polymer having a molecular weight higher than 100,000 is not preferable because the viscosity of the resulting ink becomes too high.

The concentration of such a water-soluble polymeric substance in the ink is suitably determined as desired. It is however desirable to adjust the concentration within a range of generally from 0.001 to 20% by weight, preferably from 0.01 to 15% by weight, more preferably from 0.01 to 10% by weight.

The components for the second ink making up each of the ink sets according to the present invention will now be described. The second ink contains a water-soluble dye and an amphoteric compound as described above and is obtained by dissolving these components in a proper liquid medium. The kind and content of the water-soluble dye used in this case are the same as in the case of the first ink described above.

As the amphoteric compound used as a component for the second ink making up the ink set of the present invention, there may be suitably used most amphoteric compounds including conventional compounds and newly synthesized compounds so far as they can impart proper physical properties necessary for the ink and the performance capable of achieving the objects of the present invention to the ink. The amphoteric compounds include amphoteric surfactants, and these surfactants are preferably used in the present invention. Specific examples of the amphoteric surfactants include those synthesized from one or more of linear or branched alkylamines, unsaturated alkylamines, alkyl fatty acids, alkyl halides and the like, which each have 8 to 18 carbon atoms in total as a raw material for a hydrophobic group, and one or more of polyamines, monochloroacetic acid salts, acrylic acid, caprolactam, maleic acid, chloroalkylsulfonic acid salts, aminosulfonic acid salts, ethylene oxide, aminoethylethanolamine, sulfating agents and the like as a raw material for a hydrophilic group, for example, betaine type compounds, amino acid derivatives and imidazoline derivatives. These amphoteric surfactants may be used either singly or in any suitable combination thereof.

Besides the amphoteric surfactants mentioned above, compounds represented by the following general formula (I) may also be suitably used as the amphoteric compounds to be used in the present invention.

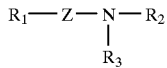

(I)

wherein $R_1$ is an alkyl group having 1 to 48 carbon atoms or hydrogen, $R_2$ is $(CH_2)_a$-$X_1$ or hydrogen, a is an integer of 1 to 4, $R_3$ is $(CH_2)_b$-$X_2$, $R_4$-Y or hydrogen, b is an integer of 1 to 4, $R_4$ is an alkyl group having 1 to 48 carbon atoms or hydrogen, Z is $(NR_5C_lH_{2l})_c(NHC_nH_{2n})_d$, l and n are individually an integer of 2 to 4, sum of c+d is an integer of 0 to 50, Y is $(NR_6C_mH_{2m})_e(NHC_pH_{2p})_f$, m and p are individually an integer of 2 to 4, sum of e+f is an integer of 0 to 50, $R_5$ is $(CH_2)_g$-$X_3$, g is an integer of 1 to 4, $R_6$ is $(CH_2)_h$-$X_4$, h is an integer of 1 to 4, and $X_1$, $X_2$, $X_3$ and $X_4$ are individually selected from the group consisting of a carboxyl group, salts of a carboxyl group, a sulfonic group, salts of a sulfonic group and hydrogen, with the proviso that when $R_2$ and $R_3$ are individually hydrogen, c and e are not 0 at the same time, and $X_1$, $X_2$, $X_3$ and $X_4$ are not hydrogen at the same time.

The molecular weight of such an amphoteric compound may preferably be within a range of from 100 to 3,000. It is more preferable to use that having a molecular weight ranging from 200 to 2,500. The use of any amphoteric compound having a molecular weight lower than 100 is not preferable because the desired effect of the addition of the amphoteric compound becomes little. On the other hand, the use of any amphoteric compound having a molecular weight higher than 3,000 is not preferable because the viscosity of the resulting ink becomes too high.

As the anionic or cationic surfactant preferably used as a component for an ink making up the ink set according to the second aspect of the present invention, there may be used most anionic or cationic surfactants including conventional compounds and newly synthesized compounds so far as they can impart proper physical properties necessary for the ink and the performance capable of achieving the objects of the present invention to the ink.

Examples of the anionic surfactant include those synthesized from one or more of carboxylic acid salts, sulfonic acid salts, sulfuric ester salts, phosphoric ester salts and the like as a raw material for a hydrophilic group, and one or more of paraffinic or olefinic hydrocarbons having 12 to 18 carbon atoms, benzene derivatives having an alkyl group having 11 to 15 carbon atoms, $C_{1-5}$-alkylnaphthalenes, $C_{12-18}$-alkylphenols, higher alcohols, higher mercaptans, higher fatty acids having 11 to 18 carbon atoms, higher fatty acid esters having 8 to 21 carbon atoms in total, partial esters of a polyhydric alcohol with a fatty acid having 11 to 17 carbon atoms, higher fatty acid amides having 11 to 17 carbon atoms, other oils and fats, waxes and the likes as a raw material for a hydrophobic group.

Examples of the cationic surfactant include those synthesized from one or more of quaternary ammonium salts, quaternary ammonium salts of benzyl halides, amine salts, alkanolamine salts, pyridinium salts and the like as a raw material for a hydrophilic group having 11 to 18 carbon atoms and one or more of higher fatty acids, higher amines having 12 to 34 carbon atoms, higher fatty acid amides having 11 to 17 carbon atoms, higher alkyl halide having 11 to 17 carbon atoms and the like as a raw material for a hydrophobic group.

It is not necessary to define the amount of the amphoteric compound, the anionic surfactant and the cationic surfactant mentioned above in the ink as far as they can impart necessary performances capable of achieving the objects of the present invention to the ink, although the amount may be varied depending on a molecular weight of the dye in the ink, in addition to the amphoteric compound, the anionic surfactant and the cationic surfactant. However, of course, when used too little, necessary performance cannot be exhibited, and when used too much, it may influence excessively to a physical property of an ink such as a viscosity increase, a lowering of a surface tension and the like so that there may arise a risk to obstruct a performance of ejection from fine orifices. Consequently, the amount of the amphoteric compound, the anionic surfactant and the cationic surfactant is preferably within a range of from 0.01 to 10% by weight, more preferably from 0.05 to 5% by weight, and most preferably from 0.05 to 2% by weight.

The inks according to the present invention are prepared by dissolving the respective components such as the dye in a liquid medium. As the liquid medium to be used in this time, a mixed solvent of water and an organic solvent is preferably used. The use of the mixed solvent as a liquid medium has an advantage that the resulting ink is prevented from changing its physical or chemical properties (for example, pH value) over an extremely long period of time (for example, 6 months to 1 year or longer).

The organic solvent to be used is suitably selected for use from such water-soluble organic solvents as mentioned below as desired. Specific examples of the water-soluble organic solvents usable in the present invention include alkyl alcohols having 1 to 7 carbon atoms, such as methyl alcohol, ethyl alcohol, n-propyl alcohol, isopropyl alcohol, n-butyl alcohol, sec-butyl alcohol, tert-butyl alcohol, isobutyl alcohol, amyl alcohol, n-hexanol and cyclohexanol; ketones and ketone alcohols such as acetone and diacetone alcohol; alkanolamines such as monoethanolamine and diethanolamine; amides such as dimethylformamide and dimethylacetamide; ethers such as tetrahydrofuran and dioxane; polyhydric alcohols having the alkylene group of which has 2 to 6 carbon atoms, such as ethylene glycol, diethylene glycol, triethylene glycol, propylene glycol, thiodiglycol, butylene glycol and glycerol; lower alkyl mono- or diethers derived from alkylene glycols (having 3 to 8 carbon atoms in total), such as ethylene glycol monomethyl (monoethyl or monopropyl) ether, diethylene glycol monomethyl (monoethyl or monobutyl) ether, diethylene glycol dimethyl (or diethyl) ether and polyethylene glycol monomethyl (or monoethyl) ether; nitrogen-containing 5-membered cyclic ketones such as 2-pyrrolidone and N-methyl-2-pyrrolidone; intramolecular esters of hydroxy carboxylic acid, such as α-valerolactone, ε-caprolactone and butyrolactone; morpholine; dimethylimidazolidine; and sulfolane.

The content of the water-soluble organic solvent in the ink is desirably within a range of generally from 5 to 90% by weight, preferably from 10 to 80% by weight, more preferably from 10 to 50% by weight based on the total weight of the ink, while the content of water is desirably within a range of generally from 10 to 90% by weight, preferably from 10 to 70% by weight, more preferably from 20 to 70% by weight based on the total weight of the ink.

The various inks prepared in the above-described manner and used in the present invention are excellent in affinity for, particularly, recording media having a high sizing degree and are particularly excellent in high-speed recordability, optical density of recorded images, color tone, water fastness, rub-off resistance and light fastness. Besides, the inks are practical inks excellent in storage stability, signal responsiveness, stability of droplet formation, ejection stability and continuous recordability.

In the various inks used in the present invention, various kinds of additives may be additionally used in addition to the above-described respective components for the purpose of improving physical properties of the inks. Examples of the additives include pH adjustors, anti-drying agents for crystalline organic compounds such as urea, viscosity modifiers, surface tension modifiers such as various surfactants, mildewproofing agents, and disinfectants. When the inks are used in a system that a droplets of an ink are charged to deflect them, thereby conducting recording, in particular, a resistivity regulative agent may be mentioned as an additive.

According to the present invention, the respective color inks adjusted so as to have the desired physical properties with such excellent properties as described above are prepared. An ink set comprising in combination at least two inks of different colors is provided from these inks and applied to various ink-jet recording systems, thereby forming high-density and high-quality images. Namely, in the present invention, at least two inks respectively having the above-described physical properties are used to form an image by an ink-jet system, whereby the intended objects can be achieved. As the ink-jet system applied to the ink-jet recording method according to the present invention, any conventionally-known system may be used. Namely, various ink-jet recording apparatus other than a recording apparatus having a recording head of the type that mechanical vibration by a piezo-oscillator is utilized to generate droplets may also be preferably used. For example, apparatus in which recording signals are applied in the form of thermal energy to an ink in the interior of a recording head to generate droplets of the ink, thereby conducting recording, and the like may also be preferably used.

The black inks and other color inks used in the present invention may also be used as inks for writing utensils such as marking pens and fountain pens. However, their various properties including viscosity and surface tension must be adjusted so as to be suited for writing utensils if used as inks for writing utensils.

Figure 2:
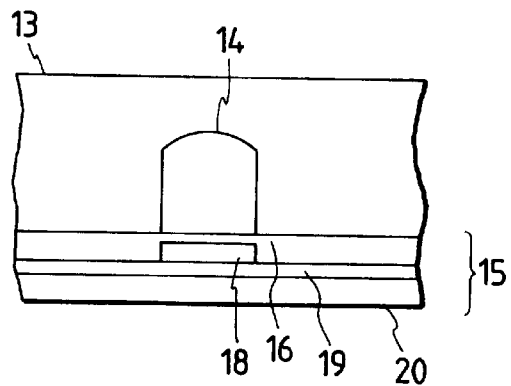
FIG. 2 is a transverse cross-sectional view of the head of the ink-jet recording apparatus.
Figure 3:
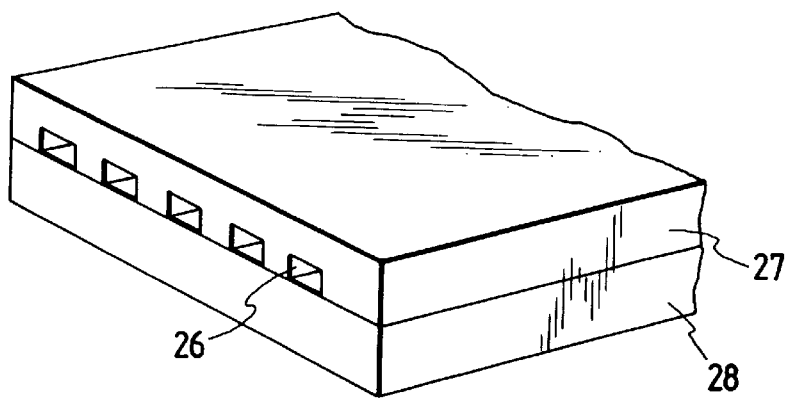
FIG. 3 is a perspective view of the appearance of a multi-head which is an array of such heads as shown in FIG. 1.

The above-described recording apparatus applied to the present invention, in which thermal energy corresponding to recording signals is applied to an ink in the interior of a recording head, and droplets of the ink are generated by the thermal energy, thereby conducting recording, will hereinafter be described. Examples of the construction of a head, which is a main component of the apparatus, are illustrated in FIGS. 1, 2 and 3.

A head 13 is formed by bonding a glass, ceramic or plastic plate or the like having a groove 14 through which an ink is passed, to a heating head 15, which is used for thermal recording (the drawings show a thin film head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure P.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the pressure thus produced, and the ink 21 is ejected from the ejection orifice 22 to a recording medium 25 in the form of minute droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of ink, and FIG. 2 is a cross-sectional view taken along line 2—2 in FIG. 1.

Figure 4:
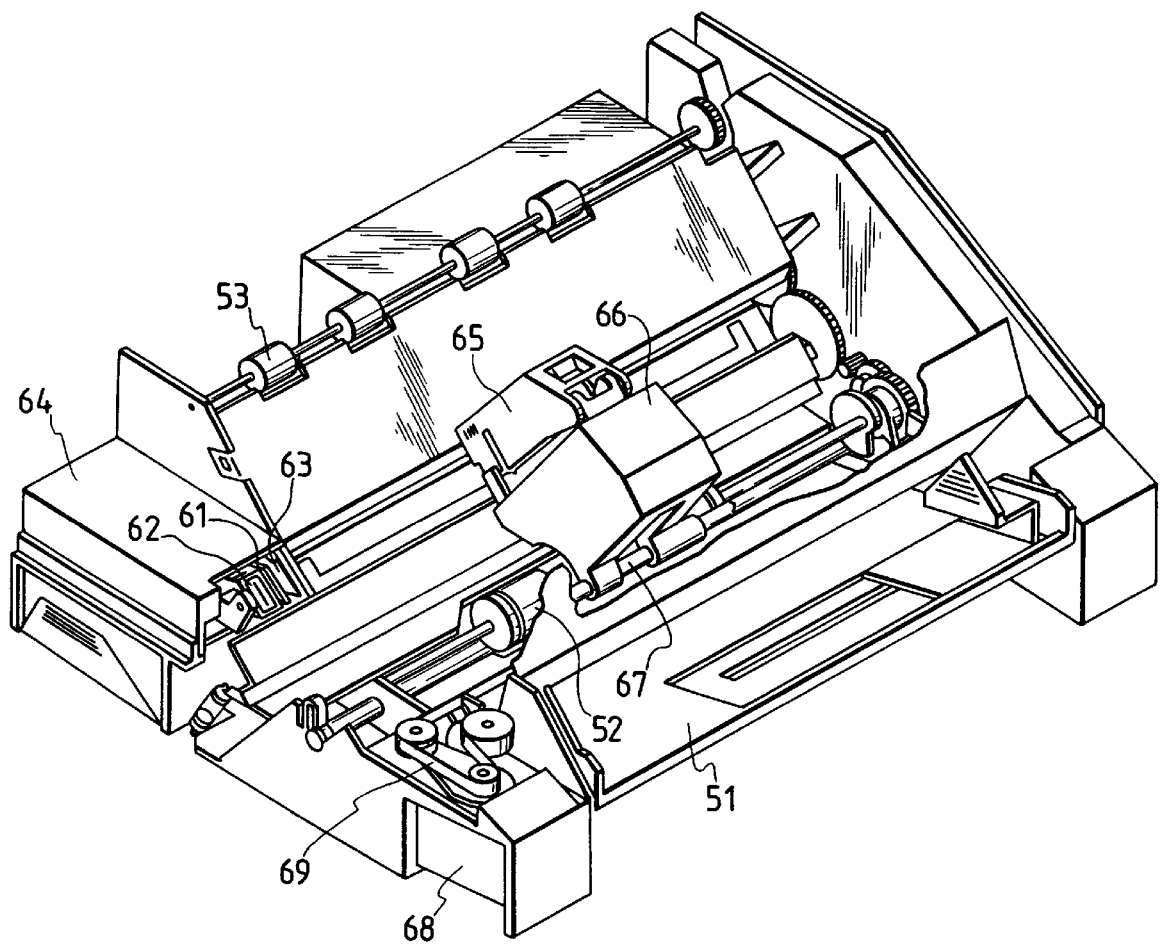
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes into the course through which the recording head is moved.

Reference numeral 62 indicates a cap for a face of ejection openings of the recording head 65, which is provided at a home position adjacent to the blade 61, and is so constructed that it moves in a direction perpendicular to a direction in which the recording head is moved, and comes into contact with the face of ejection openings to cap it. Reference numeral 63 denotes an ink-absorbing member provided adjoiningly to the blade 61 and, similar to the blade 61, held in such a form that it protrudes into the course through which the recording head is moved.

The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head is recovered for ejection, but also when the recording head 65 is moved between recording regions for the purpose of recording, during which it is moved to the home position adjacent to each recording region at given intervals, where the ejection opening face is wiped in accordance with this movement.

The present invention will hereinafter be described in more detail by the following Examples and Comparative Examples. Incidentally, all designations of "part" or "parts" as will be used in the following examples mean part or parts by weight unless expressly noted.

EXAMPLES 1 TO 6 AND COMPARATIVE EXAMPLE 1

Their corresponding components for inks shown in Tables 1 and 2 were thoroughly stirred in a vessel and the mixtures were then filtered under pressure through a Teflon filter having a pore size of 1 μm, thereby preparing inks according to Examples 1 to 6 and Comparative Example 1.

Incidentally, compounds of structural formulae A and B in Table 1 are compounds described below.

Compound of structural formula A:

$C_{12}H_{25}NH—C_2H_4NHC_2H_4NH—C_2H_4NH—CH_2COONa.$

Compound of structural formula B:

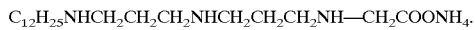

$C_{12}H_{25}NHCH_2CH_2CH_2NHCH_2CH_2CH_2NH—CH_2COONH_4.$

Also incidentally, "Comp'n ratio" and "Mw" in Tables 1 and 2 mean a compositional ratio and a molecular weight in round numbers, respectively.

TABLE 1-1

Ink compositions (Examples 1 and 2)

| | First ink | | | Second ink | |
|---|---|---|---|---|---|
| Component | Comp'n ratio (wt.) | Mw | Component | Comp'n ratio (wt.) | Mw |
| Example 1 | | | | | |
| C.I. Food Black 2 | 3 | | C.I. Basic Yellow 25 | 2.5 | |
| Ethyl alcohol | 5 | | Ethyl alcohol | 5 | |
| Ethylene glycol | 20 | | Ethylene glycol | 20 | |
| Polyethylene glycol | 5 | 400 | Polyethylene glycol | 5 | 400 |
| Compound of structural formula A | 0.1 | | Polyallyl-amine hydro-chloride | 1 | 10,000 |
| Deionized water | 66.9 | | Deionized water | 66.5 | |
| Example 2 | | | | | |
| C.I. Direct Black 195 | 2.5 | | C.I. Basic Red 92 | 2.5 | |
| Ethyl alcohol | 5 | | Ethyl alcohol | 5 | |
| Ethylene glycol | 20 | | Ethylene glycol | 20 | |
| Urea | 5 | | Polyethylene glycol | 5 | 400 |
| Polyacrylic acid | 1 | 10,000 | Lauryl-betaine | 0.5 | |
| Deionized water | 66.5 | | Deionized water | 67 | |

TABLE 1-2

Ink compositions (Examples 3 and 4)

| | First ink | | | Second ink | |
|---|---|---|---|---|---|
| Component | Comp'n ratio (wt.) | Mw | Component | Comp'n ratio (wt.) | Mw |
| Example 3 | | | | | |
| C.I. Food Black 2 | 3 | | C.I. Basic Yellow 25 | 2.5 | |
| Ethyl alcohol | 5 | | Ethyl alcohol | 5 | |
| Ethylene glycol | 20 | | Ethylene glycol | 20 | |
| Polyethylene glycol | 5 | 400 | Polyethylene glycol | 5 | 400 |
| Polyvinyl pyrrolidone | 0.1 | 40,000 | Compound of structural formula B | 0.2 | |
| Deionized water | 66.9 | | Deionized water | 67.3 | |
| Example 4 | | | | | |
| C.I. Direct Black 195 | 2.5 | | C.I. Basic Red 92 | 2.5 | |
| Ethyl alcohol | 5 | | Ethyl alcohol | 5 | |
| Ethylene glycol | 20 | | Ethylene glycol | 20 | |
| Urea | 5 | | Polyethylene glycol | 5 | 400 |
| Polyacrylic acid | 1 | 10,000 | Lauryl-betaine | 0.2 | |
| Deionized water | 66.5 | | Deionized water | 67.3 | |

TABLE 1-3

Ink compositions (Examples 5 and 6)

| | First ink | | | Second ink | |
|---|---|---|---|---|---|
| Component | Comp'n ratio (wt.) | Mw | Component | Comp'n ratio (wt.) | Mw |
| Example 5 | | | | | |
| Aizen Cathi-lon Black BXH (product of Hodogaya Chemical Co., Ltd.) | 3 | | C.I. Acid Red 289 | 3 | |

TABLE 1-3-continued

Ink compositions (Examples 5 and 6)

| | First ink | | | Second ink | | |
|---|---|---|---|---|---|---|
| Component | Comp'n ratio (wt.) | Mw | Component | Comp'n ratio (wt.) | Mw |
| Ethyl alcohol | 5 | | Ethyl alcohol | 5 | |
| Ethylene glycol | 20 | | Ethylene glycol | 20 | |
| Polyethylene glycol | 5 | 400 | Diethylene glycol | 5 | |
| Polyethylene imine | 0.5 | 10,000 | Urea | 5 | |
| Deionized water | 66.5 | | Sodium polyvinyl sulfate | 0.5 | 11,000 |
| — | | | Polyoctyl polyamino-ethylglycine | 0.1 | |
| — | | | Deionized water | 61.4 | |
| Example 6 | | | | | |
| C.I. Direct Blue 199 | 3 | | C.I. Basic Red 92 | 2.5 | |
| Ethyl alcohol | 5 | | Ethyl alcohol | 5 | |
| Ethylene glycol | 20 | | Ethylene glycol | 20 | |
| Polyethylene glycol | 5 | 400 | Polyethylene glycol | 5 | 400 |
| Polyvinyl alcohol | 0.5 | 10,000 | Polyallyl-amine hydrochloride | 0.5 | 10,000 |
| Lauryl-betaine | 0.2 | | Deionized water | 67 | |
| Deionized water | 66.3 | | — | | |

TABLE 2

Ink composition (Comparative Example 1)

| | First Ink | | | Second Ink | | |
|---|---|---|---|---|---|---|
| Component | Comp'n ratio (wt.) | Mw | Component | Comp'n ratio (wt.) | Mw |
| Comparative Example 1 | | | | | |
| C.I. Food Black 2 | 3 | | C.I. Basic Yellow 25 | 2.5 | |
| Ethyl alcohol | 5 | | Ethyl alcohol | 5 | |
| Ethylene glycol | 20 | | Ethylene glycol | 20 | |
| Polyethylene glycol | 5 | 400 | Polyethylene glycol | 5 | 400 |
| Deionized water | 67 | | Deionized water | 67.5 | |

[Evaluation]

Using the inks according to Examples 1 to 6 of the present invention and Comparative Example 1, ink-jet recording was conducted on recording media shown in Table 3 by means of a recording apparatus equipped with an On-Demand type recording head (ejecting orifice diameter: 50 μm; drive voltage for a piezo-oscillator: 60 V; frequency: 4 kHz) which ejected an ink by the piezo-oscillator, and evaluation was conducted as to items $T_1$ to $T_3$ which will be described subsequently.

$T_1$: Quality of single-color print on various recording media

Printing was conducted on each of the recording media with each ink in each ink set to evaluate the print quality of the resulting single-color image. In this case, attention was paid to sharpness of edge parts of dots or degree of feathering. The thus-obtained evaluation results are shown in Table 4 in accordance with the following standard:

(Evaluation standard)

A: Almost perfect;

B: Somewhat dissatisfactory but practicable without problems;

C: A problem conspicuously arose; and

D: Leaving no traces of the desired image $T_2$: Quality of two-color-mixture print on various recording media Printing was conducted on each of the recording media with two inks in each ink set in such a manner that the inks overlap each other to evaluate the print quality of the resulting two-color-mixture images. In this case, attention was paid to shapes of dots or degree of feathering. The thus-obtained evaluation results are shown in Table 4 in accordance with the following standard:

(Evaluation standard)

A: Almost perfect;

B: Somewhat dissatisfactory but practicable without problems;

C: A problem conspicuously arose; and

D: Leaving no traces of the desired image.

$T_3$: Resistance to bleeding between adjoining solid prints of different colors on various recording media Solid printing was conducted on each of the recording media in such a manner that right after one ink in each ink set was ejected, the other ink was ejected so as to adjoin the former ink. In this case, attention was paid to degree of bleeding. The thus-obtained evaluation results are shown in Table 4 in accordance with the following standard:

(Evaluation standard)

A: Almost perfect;

B: Somewhat dissatisfactory but practicable without problems;

C: A problem conspicuously arose; and

D: Leaving no traces of the desired image.

TABLE 3

Kinds of recording media

| Recording medium | Grade | Maker |
|---|---|---|
| PB-Paper | Wood free paper | Canon Inc. |
| 4024 DP Paper | Wood free paper | Xerox Co. |
| Hakubotan | Medium-quality paper | Honshu Paper Co. Ltd. |
| Postal card | — | — |

(Evaluation results)

Shown in the following Table 4 are the evaluation results on the items $T_1$, $T_2$ and $T_3$ as to the inks used in Examples 1 to 6 and Comparative Example 1 and the features of the resultant images.

TABLE 4

Evaluation results in Examples 1 to 6 and Comparative Example 1 ($T_1$, $T_2$ and $T_3$)

| | $T_1$: Print quality in single color | | $T_2$: Print quality upon two-color mixing | $T_3$: Bleeding between two colors |
|---|---|---|---|---|
| | 1st ink | 2nd ink | | |
| Ex. 1 | A | A | A | A |
| Ex. 2 | A | B | A | A |
| Ex. 3 | A | A | A | A |
| Ex. 4 | A | A | A | A |
| Ex. 5 | B | A | A | A |
| Ex. 6 | A | A | A | A |
| Comp. Ex. 1 | A | B | B | D |

As shown in Table 4, the color images obtained by using the ink sets of Examples 1 to 6 achieved good results in all the evaluation items ($T_1$, $T_2$ and $T_3$), on any one of recording media shown in Table 3. On the other hand, the color images obtained by using the ink set of Comparative Example 1 did not satisfy all the evaluation items at the same time.

Besides, the same investigation as described above was carried out with the ink sets according to Examples 1 to 6 by means of a recording apparatus equipped with an On-Demand type multi-head (ejecting orifice diameter: 35 $\mu$m; resistance of a heating resistor: 150 $\Omega$; drive voltage: 30 V; frequency: 2 kHz) which applied thermal energy to an ink within a recording head to generate droplets, thereby conducting recording. As a result, all the ink sets of Examples 1 to 6 were found to achieve excellent results.

EXAMPLE 7

| (Component of first ink) | | |
|---|---|---|
| C.I. Direct Black 195 | 3 | parts |
| Ethyl alcohol | 1 | part |
| Ethylene glycol | 10 | parts |
| Urea | 5 | parts |
| Sodium dioctyl sulfosuccinate | 0.1 | part |
| Deionized water | 80.9 | parts. |
| (Component of second ink) | | |
| C.I. Basic Yellow 25 | 2.5 | parts |
| Ethyl alcohol | 1 | part |
| Ethylene glycol | 10 | parts |
| Sodium lauryldiaminoethylglycine | 2 | parts |
| Deionized water | 84.5 | parts. |

Each of the first and second inks was prepared by thoroughly stirring its corresponding components in a vessel and then filtering the mixture under pressure through a Teflon filter having a pore size of 0.45 $\mu$m.

EXAMPLE 8

| (Component of first ink) | | |
|---|---|---|
| C.I. Basic Red 92 | 2.5 | parts |
| Ethyl alcohol | 1 | part |
| Ethylene glycol | 10 | parts |
| Urea | 5 | parts |
| Cetyltrimethylammonium chloride | 0.1 | part |
| Deionized water | 81.4 | parts. |
| (Component of second ink) | | |
| Dye of the following structural formula (a) | 1.2 | parts |
| Dye of the following structural formula (b) | 1.3 | parts |
| Ethyl alcohol | 3 | parts |
| Ethylene glycol | 10 | parts |
| Urea | 5 | parts |
| Laurylcarboxymethylhydroxethyl-imidazolinium betaine | 2 | parts |
| Deionized water | 77.5 | parts. |

Each of the first and second inks was prepared by thoroughly stirring its corresponding components in a vessel and then filtering the mixture under pressure through a Teflon filter having a pore size of 0.45 $\mu$m.

Dye of structural formula (a):

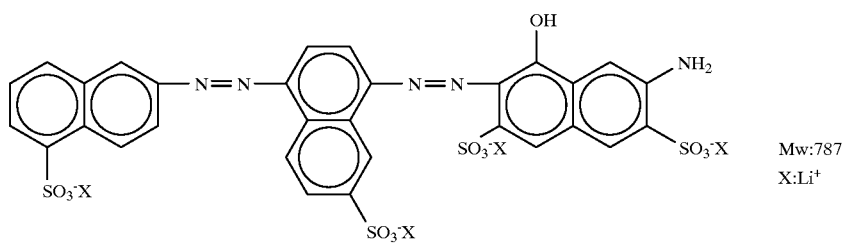

(a)

Mw:787
X:Li$^+$

Dye of structural formula (b):

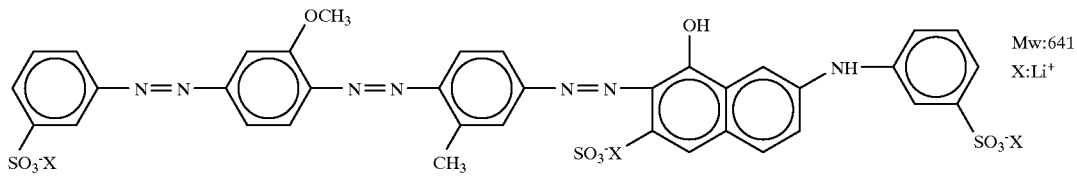
(b)

[Evaluation methods]

Using the inks according to Examples 7 and 8, printing was conducted on wood free paper including the following commercially-available paper for copying.

PB PAPER: trade name, paper for copying produced by Canon Inc.

4024 PAPER: trade name, product of Xerox Co.

PLOVER BOND PAPER: trade name, product of FOX RIVER.

Figure 5:
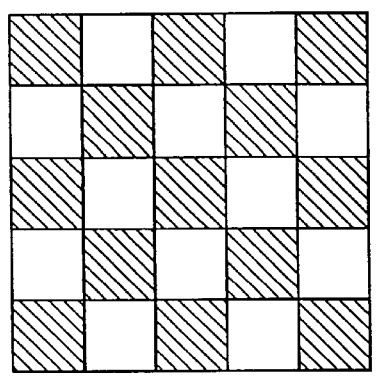
FIG. 5 illustrates a pattern for evaluation of an image quality.

(1) Pring quality of picture image:

Solid printing was conducted alternately with two ink into portions sectioned by 5×5 in a 1-cm square as shown in FIG. 5 to evaluate the quality of the resulting image as to bleeding between two colors in accordance with the following evaluation standard. The results are shown in Table 5.

(Evaluation standard)

A: Boundary lines between two colors were sharp-cut, and neither bleeding nor color mixing was observed at boundary parts;

B: Boundary lines were clearly present between two colors, but bleeding and/or color mixing was somewhat observed at boundary parts; and C: Boundary lines between two colors were indistinguishable.

(2) Print quality of characters:

Qualities of single-color characters and color-mixture characters were then evaluated. The evaluation of the characters was conducted as to a sentence composed by 1,500 words of English characters and numerals, and Chinese characters printed on a A4-sized wood free paper sheet. The printing was conducted in shot-in ink proportions of 100% for the single color and 200% for the two-color mixture. The qualities were ranked in accordance with the following standard:

A: Edges of characters were sharp, and neither feathering nor dot gain was observed;

B: Feathering slightly occurred at edges of characters, and even dot gain was observed; and C: Edges of characters were blunted or blurred, feathering markedly occurred, and uneven dot gain was observed.

The results are shown in Table 5.

[Machine used in evaluation]

Used as the ink-jet recording apparatus was the same recording apparatus as illustrated in FIG. 4. Incidentally, a recording head used herein was the same recording head as that used in an ink-jet printer, BJC820 (trade name, manufactured by Canon Inc.). Drive conditions for the recording head, namely, energizing conditions for a heater in each head were as follows:

Applied voltage: 28 V
Pulse width: 3.2 $\mu$sec
Drive frequency: 5 kHz.

TABLE 5

Evaluation results in Examples 7 and 8

|  | (1) Quality of picture image | (2) Quality of characters | |
|---|---|---|---|
|  |  | Quality of single-color characters | Quality of color-mixture characters |
| Ex. 7 | A | A | A |
| Ex. 8 | A | A | A |

As has been described above, the present invention permits the provision of images having high color density and sharp edges even on recording paper having a high sizing degree, which is particularly high in flexibility.

The present invention also permits the provision of bright color images without causing irregular dot gain even when two inks of different colors are ejected so as to overlap each other and without causing bleeding even when two inks of different colors are continuously ejected so as to adjoin each other.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink set comprising in combination at least two inks of different colors, wherein at least one ink comprises a cationic dye and an amphoteric compound, and another ink of a color different from said one ink comprises an anionic dye and a water-soluble anionic polymer or nonionic polymer in addition to the dye.

2. An ink set comprising in combination at least two inks of different colors, wherein at least one ink comprises a cationic dye and an amphoteric compound, and another ink of a color different from said one ink comprises an anionic dye and an anionic surfactant in addition to the dye.

3. An ink set comprising in combination at least two inks of different colors, wherein at least one ink comprises an anionic dye and an amphoteric compound, and another ink of a color different from said one ink comprises a cationic dye and a water-soluble cationic polymer or nonionic polymer in addition to the dye.

4. An ink set comprising in combination at least two inks of different colors, wherein at least one ink comprises an anionic dye and an amphoteric compound, and another ink of a color different from said one ink comprises a cationic dye and a cationic surfactant in addition to the dye.

5. The ink set according to any one of claims 1 to 4, wherein the inks are water-based inks.

6. The ink set according to any one of claims 1 to 4, wherein the amphoteric compound is an amphoteric surfactant.

7. The ink set according to any one of claims 1 to 4, wherein the amphoteric compound has a molecular weight ranging from 100 to 3,000.

8. The ink set according to any one of claims 1 to 4, wherein the amphoteric compound is a compound represented by the formula

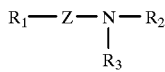

(I)

wherein $R_1$ is an alkyl group having 1 to 48 carbon atoms or hydrogen, $R_2$ is $(CH_2)a\text{-}X_1$ or hydrogen, a is an integer of 1 to 4, $R_3$ is $(CH_2)_b\text{-}X_2$, $R_4\text{-}Y$ or hydrogen, b is an integer of 1 to 4, $R_4$ is an alkyl group having 1 to 48 carbon atoms or hydrogen, Z is $(NR_5C_lH_{2l})_c(NHC_nH_{2n})_d$, l and n are individually an integer of 2 to 4, sum of c+d is an integer of 0 to 50, Y is $(NR_6C_mH_{2m})_e(NHC_pH_{2p})_f$, m and p are individually an integer of 2 to 4, sum of e+f is an integer of 0 to 50, $R_5$ is $(CH_2)_g\text{-}X_3$, g is an integer of 1 to 4, $R_6$ is $(CH_2)_h\text{-}X_4$, h is an integer of 1 to 4, and $X_1$, $X_2$, $X_3$ and $X_4$ are individually selected from the group consisting of a carboxyl group, salts of a carboxyl group, a sulfonic group, salts of a sulfonic group and hydrogen, with the proviso that when $R_2$ and $R_3$ are individually hydrogen, c and e are not 0 at the same time, and $X_1$, $X_2$, $X_3$ and $X_4$ are not hydrogen at the same time.

9. The ink set according to any one of claims 1 to 4, wherein the dye is contained in an amount ranging from 0.1 to 15% by weight in its corresponding ink.

10. The ink set according to claim 1, wherein the anionic polymer or nonionic polymer has a weight average molecular weight ranging from 3,000 to 100,000.

11. The ink set according to claim 1, wherein the anionic polymer or nonionic polymer is contained in an amount ranging from 0.001 to 20% by weight in said another ink.

12. The ink set according to claim 3, wherein the cationic polymer or nonionic polymer has a weight average molecular weight ranging from 3,000 to 100,000.

13. The ink set according to claim 3, wherein the cationic polymer or nonionic polymer is contained in an amount ranging from 0.001 to 20% by weight in said another ink.

14. The ink set according to claim 1, wherein the amphoteric compound is contained in an amount ranging from 0.01 to 10% by weight in the ink.

15. The ink set according to claim 2, wherein the amphoteric compound is contained in an amount ranging from 0.01 to 10% by weight in the ink.

16. The ink set according to claim 3, wherein the amphoteric compound is contained in an amount ranging from 0.01 to 10% by weight in the ink.

17. The ink set according to claim 4, wherein the amphoteric compound is contained in an amount ranging from 0.01 to 10% by weight in the ink.

18. The ink set according to claim 2, wherein the anionic surfactant is contained in an amount ranging from 0.01 to 10% by weight in said another ink.

19. The ink set according to claim 4, wherein the cationic surfactant is contained in an amount ranging from 0.01 to 10% by weight in said another ink.

20. An ink-jet recording method comprising using at least two inks of different colors to record color images in accordance with an ink-jet system, wherein the ink set according to claim 1 is used as said inks.

21. An ink-jet recording method comprising using at least two inks of different colors to record color images in accordance with an ink-jet system, wherein the ink set according to claim 2 is used as said inks.

22. An ink-jet recording method comprising using at least two inks of different colors to record color images in accordance with an ink-jet system, wherein the ink set according to claim 3 is used as said inks.

23. An ink-jet recording method comprising using at least two inks of different colors to record color images in accordance with an ink-jet system, wherein the ink set according to claim 4 is used as said inks.

24. The ink-jet recording method according to any one of claims 20 to 23, wherein the inks are water-based inks.

25. The ink-jet recording method according to any one of claims 20 to 23, wherein the amphoteric compound in said inks is an amphoteric surfactant.

26. The ink-jet recording method according to any ne of claims 20 to 23, wherein the amphoteric compound in aid inks has a molecular weight ranging from 100 to 3,000.

27. The ink-jet recording method according to any one of claims 20 to 23, wherein the amphoteric compound in said inks is a compound represented by the formula

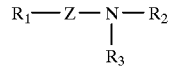

(I)

wherein $R_1$ is an alkyl group having 1 to 48 carbon atoms or hydrogen, $R_2$ is $(CH_2)_a\text{-}X_1$ or hydrogen, a is an integer of 1 to 4, $R_3$ is $(CH_2)_b\text{-}X_2$, $R_4\text{-}Y$ or hydrogen, b is an integer of 1 to 4, $R_4$ is an alkyl group having 1 to 48 carbon atoms or hydrogen, Z is $(NR_5C_lH_{2l})_c(NHC_nH_{2n})_d$, l and n are individually an integer of 2 to 4, sum of c+d is an integer of 0 to 50, Y is $(NR_6C_mH_{2m})_e(NHC_pH_{2p})_f$, m and p are individually an integer of 2 to 4, sum of e+f is an integer of 0 to 50, $R_5$ is $(CH_2)_g\text{-}X_3$, g is an integer of 1 to 4, $R_6$ is $(CH_2)_h\text{-}X_4$, h is an integer of 1 to 4, and $X_1$, $X_2$, $X_3$ and $X_4$ are individually selected from the group consisting of a carboxyl group, salts of a carboxyl group, a sulfonic group, salts of a sulfonic group and hydrogen, with the proviso that when $R_2$ and $R_3$ are individually hydrogen, c and e are not 0 at the same time, and $X_1$, $X_2$, $X_3$ and $X_4$ are not hydrogen at the same time.

28. The ink-jet recording method according to any one of claims 20 to 23, wherein the dye in said inks is contained in an amount ranging from 0.1 to 15% by weight in its corresponding ink.

29. The ink-jet recording method according to claim 20, wherein the anionic polymer or nonionic polymer in said inks has a weight average molecular weight ranging from 3,000 to 100,000.

30. The ink-jet recording method according to claim 20, wherein the anionic polymer or nonionic polymer in said inks is contained in an amount ranging from 0.001 to 20% by weight in said another ink.

31. The ink-jet recording method according to claim 22, wherein the cationic polymer or nonionic polymer in said inks has a weight average molecular weight ranging from 3,000 to 100,000.

32. The ink-jet recording method according to claim 22, wherein the cationic polymer or nonionic polymer in said inks is contained in an amount ranging from 0.001 to 20% by weight in said another ink.

33. The ink-jet recording method according to any one of claims 20 to 23, wherein the amphoteric compound in said inks is contained in an amount ranging from 0.01 to 10% by weight in its correponding ink.

34. The ink-jet recording method according to claim 21, wherein the anionic surfactant in said inks is contained in an amount ranging from 0.01 to 10% by weight in the another ink.

35. The ink-jet recording method according to claim 23, wherein the cationic surfactant in said inks is contained in an amount ranging from 0.01 to 10% by weight in the another ink.

36. The ink-jet recording method according to any one of claims 20 to 23, 29 to 32, 34 and 35, wherein the ink-jet system is an ink-jet system that thermal energy is applied to an ink to eject the ink.

37. The ink-jet recording method according to claim 24, wherein the ink-jet system is an ink-jet system that thermal energy is applied to an ink to eject the ink.

38. The ink-jet recording method according to claim 25, wherein the ink-jet system is an ink-jet system that thermal energy is applied to an ink to eject the ink.

39. The ink-jet recording method according to claim 26, wherein the ink-jet system is an ink-jet system that thermal energy is applied to an ink to eject the ink.

40. The ink-jet recording method according to claim 27, wherein the ink-jet system is an ink-jet system that thermal energy is applied to an ink to eject the ink.

41. The ink-jet recording method according to claim 28, wherein the ink-jet system is an ink-jet system that thermal energy is applied to an ink to eject the ink.

42. The ink-jet recording method according to claim 33, wherein the ink-jet system is an ink-jet system that thermal energy is applied to an ink to eject the ink.

* * * * *

UNITED STATES PATENT AND TRADEMARK OFFICE
CERTIFICATE OF CORRECTION

PATENT NO. : 5,911,815

DATED : June 15, 1999

INVENTOR(S) : MAYUMI YAMAMOTO, ET AL.   Page 1 of 3

It is certified that error appears in the above-identified patent and that said Letters Patent is hereby corrected as shown below:

COLUMN 1:

Line 9, "the" should read --an--.
    Line 13, "the" should read --an--.

COLUMN 2:

Line 6, "needs" should read --needs to be--.
    Line 9, "image" should read --images--.
    Line 43, "need" should read --need to be--.

COLUMN 3:

Line 7, "the" should read --an--.
    Line 14, "the" should read --an--.

COLUMN 5:

Line 12, "become" should read --attains--.
    Line 31, "more" should read --further--.

COLUMN 6:

Line 56, "Specific" should read --specific--.

COLUMN 10:

Line 40, "of" should be deleted.

UNITED STATES PATENT AND TRADEMARK OFFICE
CERTIFICATE OF CORRECTION

PATENT NO. : 5,911,815

DATED : June 15, 1999

INVENTOR(S) : MAYUMI YAMAMOTO, ET AL.

It is certified that error appears in the above-identified patent and that said Letters Patent is hereby corrected as shown below:

COLUMN 11:

Line 12, "that a" should read --wherein--.

COLUMN 19:

Line 25, "Pring" should read --Printing--.
    Line 26, "ink" should read --inks--.
    Line 46, "wood free" should read --wood-free--.

COLUMN 21:

Line 28, "$(CH_2)a-X_1$" should read --$(CH_2)_a-X_1$--.

COLUMN 22:

Line 31, "ne" should read --one--.
    Line 32, "aid" should read --said--.

COLUMN 23:

Line 18, "correponding" should read --corresponding--.
    Line 21, "the" should read --said--.
    Line 25, "the" should read --said--.

UNITED STATES PATENT AND TRADEMARK OFFICE
CERTIFICATE OF CORRECTION

PATENT NO. : 5,911,815

DATED : June 15, 1999

INVENTOR(S) : MAYUMI YAMAMOTO, ET AL.

It is certified that error appears in the above-identified patent and that said Letters Patent is hereby corrected as shown below:

<u>COLUMN 24</u>:

```
Line 3,  "that" should read --wherein--.
Line 6,  "that" should read --wherein--.
Line 9,  "that" should read --wherein--.
Line 12, "that" should read --wherein--.
Line 15, "that" should read --wherein--.
Line 18, "that" should read --wherein--.
Line 21, "that" should read --wherein--.
```

Signed and Sealed this

Eighth Day of February, 2000

Q. TODD DICKINSON

*Attest:*

*Attesting Officer*

*Commissioner of Patents and Trademarks*